United States Patent [19]

Therond et al.

[11] 3,800,126

[45] Mar. 26, 1974

[54] AUTOMATIC ELECTRONIC DEVICE OF UNIVERSAL USE

[75] Inventors: Jean-Francois Therond, Neuilly; Jean Mermet, Grenoble; Jean-Pierre Barret, Chambourcy; Jacques Cretin, Paris, all of France

[73] Assignee: Institut Francais Du Petrole Des Carburants Et Lubrifiants, Rueil-Malmaison, France

[22] Filed: May 3, 1972

[21] Appl. No.: 249,778

[30] Foreign Application Priority Data

May 3, 1971 France .............................. 71.15912

[52] U.S. Cl. ............................ 235/150.5, 340/172.5

[51] Int. Cl. .............................................. G06j 1/00

[58] Field of Search....... 235/150.5, 150.51, 150.52, 235/150.53; 340/172.5

[56] References Cited

UNITED STATES PATENTS 3,315,235 4/1967 Carnevale et al. ............... 340/172.5

3,377,619 4/1968 Marsh et al. ..................... 340/172.5

3,501,624 3/1970 Grandine ........................ 235/150.5

3,582,628 6/1971 Brussolo ......................... 235/150.5

*Primary Examiner*—Joseph F. Ruggiero

*Attorney, Agent, or Firm*—Craig and Antonelli

[57] ABSTRACT

Automatic electronic device comprising an actuating member, a temporary storage unit, in relation with a computing unit and with various peripheral units producing analog and digital signals, a unit of said actuating member for dispatching to selected elements of the device of micro-instructions each formed of binary digit groups, one for coding and the others assigned to elementary orders, comprising means for separately storing said order groups, each connected to at least one transfer register assigned to a unique and specified function, a decoding element for the coding group, means for controlling the transfer of the order groups to at least one register in accordance with the decoded value of the coding group, said registers producing signals for controlling all the elements of the device.

6 Claims, 5 Drawing Figures

AUTOMATIC ELECTRONIC DEVICE OF UNIVERSAL USE

Figure 1:
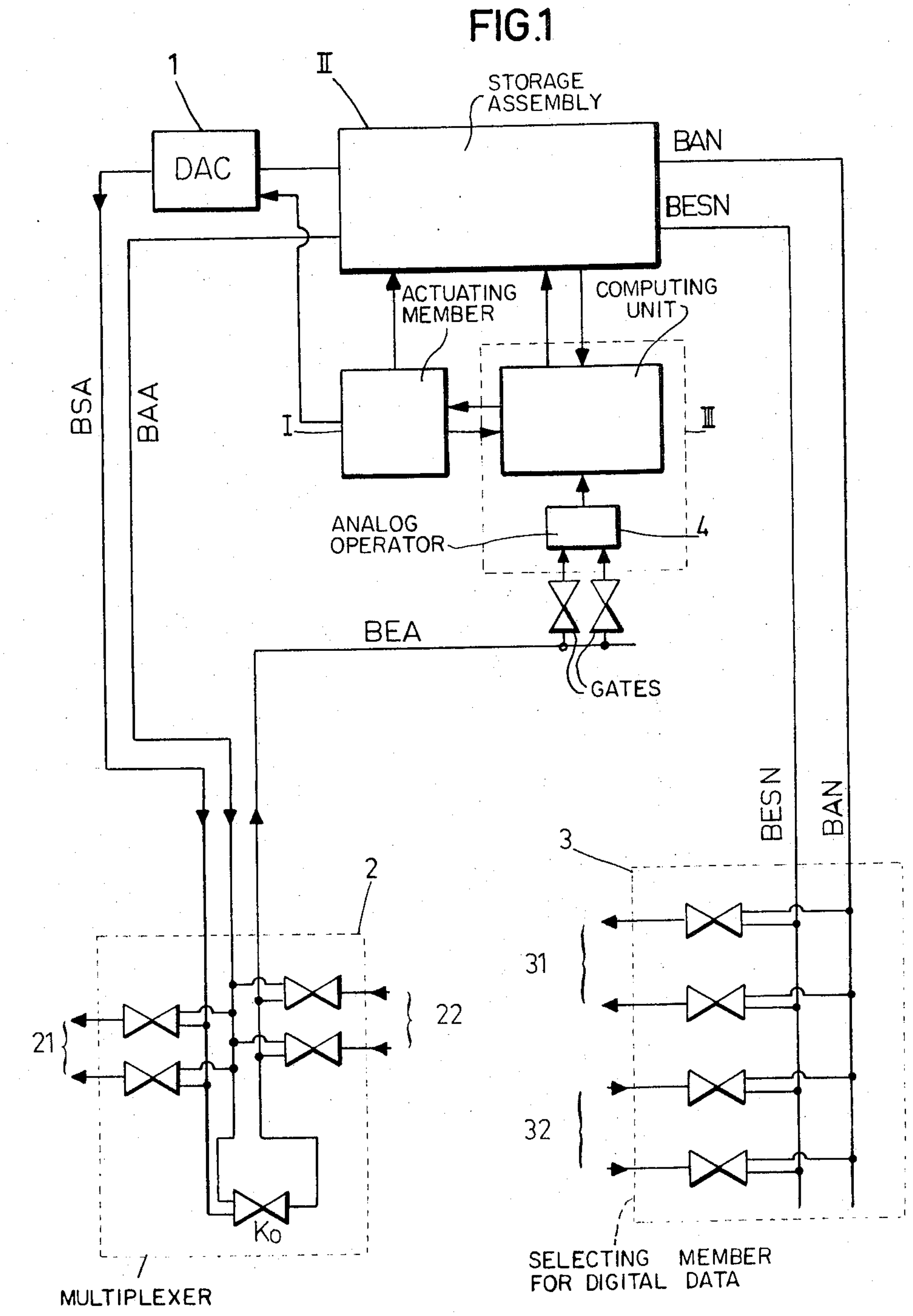

This invention relates to an automatic electronic device of universal use, particularly useful for conducting industrial processes.

This automatic device provides, by way of example, means for coupling data sensors to a data processor, elaborating and centralizing signals representing states, measuring values, order values, test values, distributing data and orders, taking decisions in accordance with external factors, performing quick arithmetic computations in real time, analog simulations and the like.

These functions are usually carried out by universal data processors or wired electronic devices, i.e., by apparatuses in which the interconnection of the electronic components is immutable, each component having its own operation definitely defined in the design.

These specialized apparatuses are not very adaptable to other uses. Moreover their manufacturing cost is high. As a matter of fact, it is necessary, for the treatment of a signal, to make use in most cases of a cascade of circuits and elements which have a specific arrangement. There are used electronic components which have a very short transmission time (of about $10^{-8}$ second) as compared to the response time of the industrial automatic devices which is rarely lower than one millisecond. Accordingly, the components are used only during a short time and consequently the product of the "cost of the components" by the "time of use" becomes excessive in the wired electronic apparatuses used in the industrial automatic devices.

The digital data processors are seldom used for controlling unstable quantities liable to rapid variations in the automatic processes. The subordination of several control loops to a single data processor of common type seems in fact dangerous, in view of a possible failure.

The degree of confidence which can be given to a program recorded in the random-acess memory of the computer is still lower than that generally given to wired electronic systems.

The data processor is usually used exclusively for carrying out the modifications of the assigned values for the control loops and is not included in the latter.

In the conducting of automatic processes, there are also used analog electronic systems which may be included, for example, in the control loops. These analog systems have, as compared to the data processors, noticeable advantages due to their high reliability as a consequence of their wired structure, their non-sequential operation, as well as the absence of peripheral systems for the supply of programs.

Moreover they are not very expensive and can perform the direct processing by analog signals of the same nature supplied thereto.

They also have the advantage, as compared to the wired electronic systems, of comprising a single type of components, i.e., the operating amplifier.

However they suffer from noticeable disadvantages. On the one hand there is no possibility of changing the use of the apparatus by modifying the connection of the elements and, on the other hand they provide for a maximal accuracy of the performed operations which is practically limited to 1 percent.

The automatic device according to this invention is more advantageous that the aforesaid processing systems for the following reasons:

In contrast to the wired automatic systems, it operates with a very small number of vary rapid electronic components which are not very specialized and are interconnected in different manners during their time of use so as to enable them to sequentially perform different functions;

It is able to capture, process and deliver analog signals in the same way as an analogical computer but with a greater accuracy and at a lower cost;

It is operated under control of a list of orders cabled in a read-only and easily exchangeable memory so that it can be inserted in a regulation loop. Its manufacturing cost is considerably lower than that of a mini-data processor with the peripheral members and the program associated thereto.

It comprises an actuating member comprising a read-only memory of micro-instructions, a computing unit and a member for the temporary storage of data, synchroneously controlled by the actuating member.

The temporary storing member comprises means for exchanging data with the computing unit, means for exchanging analog data with analog peripheral units and means for exchanging digital data with digital peripheral units.

The arrangement of the actuating member is a remarkable feature of the device. It processes micro-instructions formed of a coding binary digit group and of binary digit groups assigned to elementary orders whose meaning depends on the value of the binary digit coding group. For processing these micro-instructions, the actuating member is provided with a dispatching unit consisting of means for storing the binary digit coding group and means for separately storing each of the binary digit groups assigned to elementary orders. These means are each connected to at least one transfer register having one unique and specific function.

It further comprises a member for decoding the binary digit coding group including means for controlling the transfer of each of the binary digit groups assigned to elementary orders to at least one register according to the decoded value of the binary digit coding group.

These registers issue control signals for all the members of the device.

The arrangement of this dispatching unit provides for a substantial saving of material and of time in the operating cycle with respect to the known devices of the prior art. For decoding a micro-instruction picked up from a memory, there is generally used a combiner connected, on the one hand, to a decoding element of the binary coding group and, on the other hand, to the storing means of each of the binary digit groups assigned to elementary orders. This combiner includes a large number of logical operators connected in cascade for performing the dispatching of the data to the utilizing members. This results in a certain complexity of the apparatus and in a substantial increase of the selection time.

A second factor of time saving is in the fact that the actuating member comprises means for generating signals which define an operating cycle consisting of two complementary and offset cycle fractions, means for transferring each micro-instruction, picked up from the memory during the first cycle fraction, to said storing means of binary digits assigned to elementary orders and coding and means for transferring the binary digit groups assigned to elementary orders to the selected transfer registers, for transferring to the memory the binary digit coding group and for resetting to zero the other registers during the second fraction of the cycle.

Another important feature of the device is the fact that the computing unit comprises analog comparing means whose inputs are connected to the peripheral units producing analog signals through the intermediary of the analogical exchange unit, which includes means for connecting one of the inputs of the comparing means with means for producing calibrated signals, forming part of the actuating member.

The preferred embodiment of the device comprises at least one wired digital operator with four bits, which, in view of its performance, is the less expensive.

Figure 2:
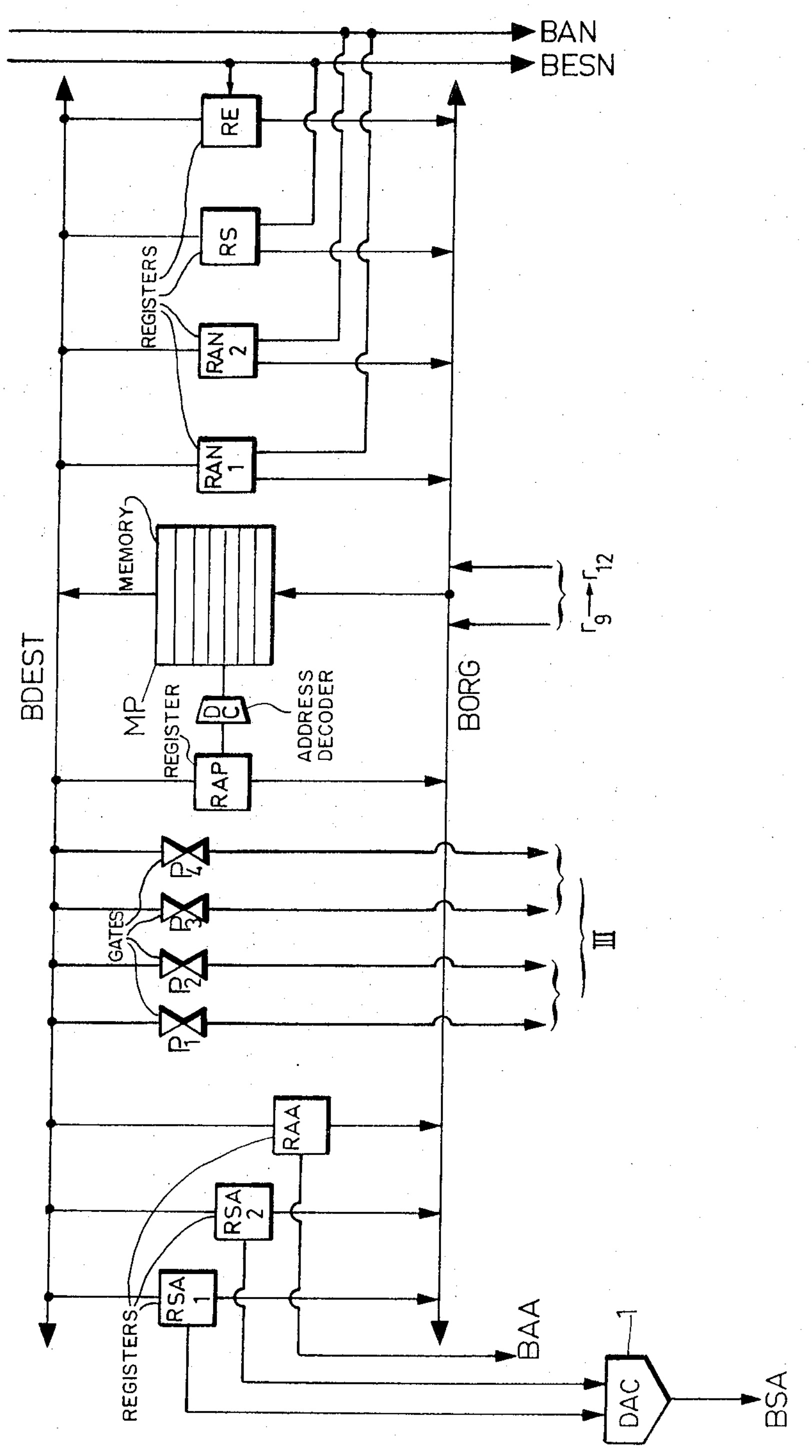
Figure 3:
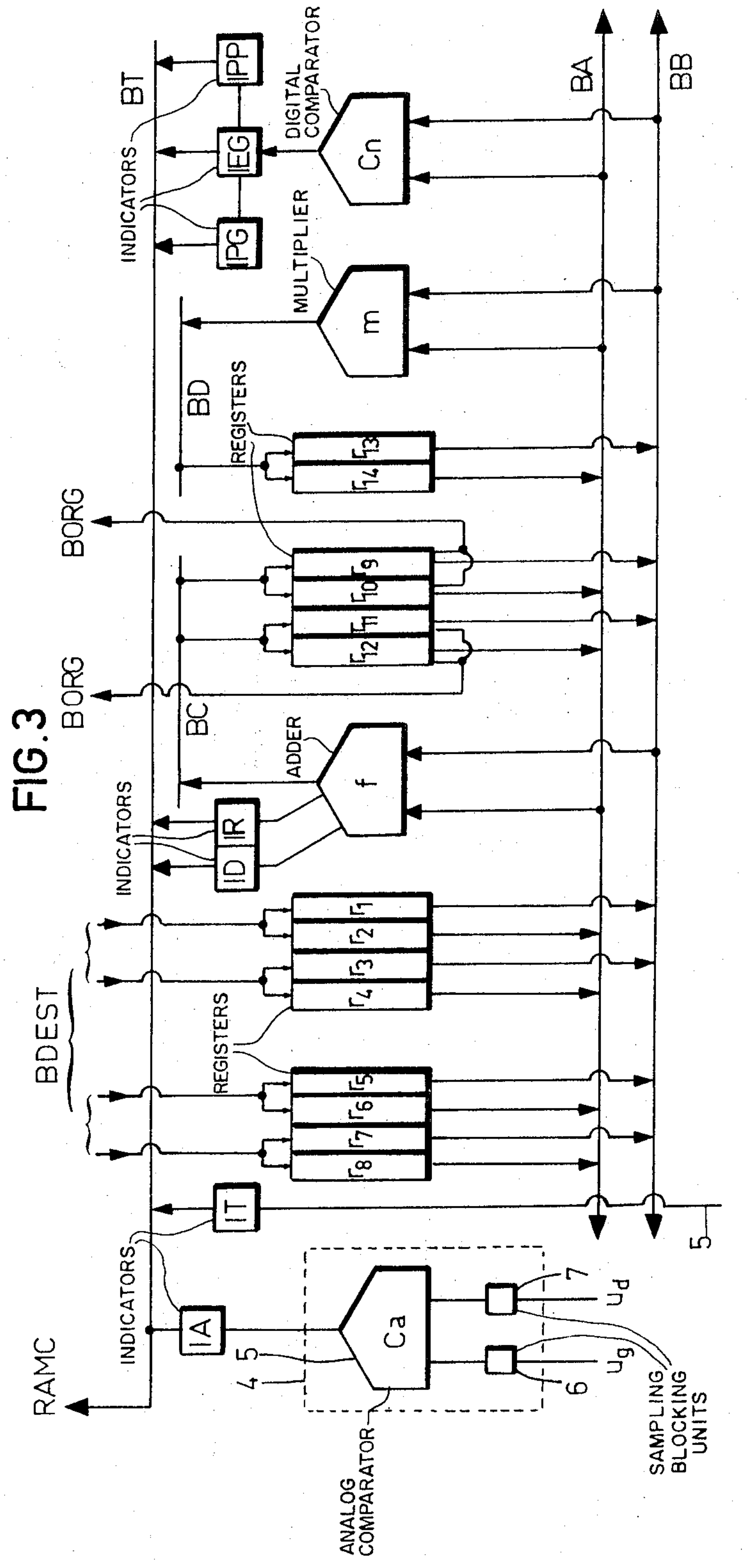
Figure 4:
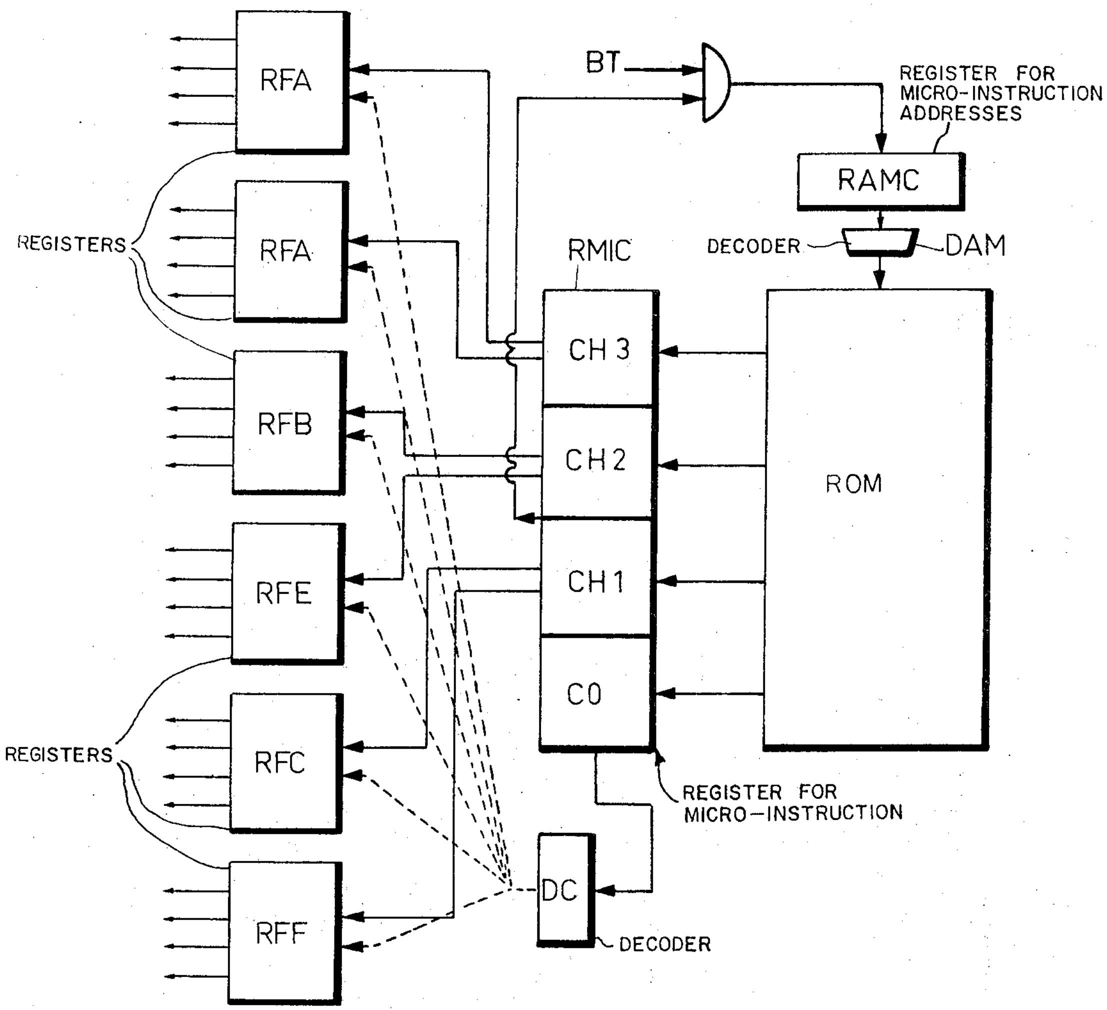
Figure 4A:
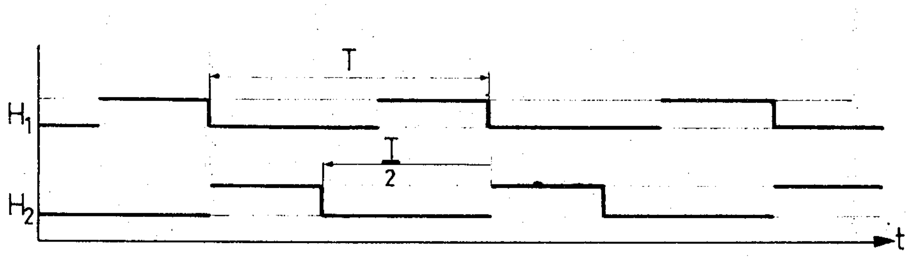

The structure, the operation and further characterizing features of the device will be described more in detail in the following description of a non-limitative embodiment, given with reference to the accompanying drawings, wherein:

FIG. 1 is a synoptical diagram of the various assemblies forming the device;

FIG. 2 diagrammatically shows a member for the temporary storage of digital values;

FIG. 3 diagrammatically shows a computing unit;

FIG. 4 diagrammatically shows an actuating member for the various elements of the device, and FIG. 4A shows chronograms of the operating cycles of the actuating member.

The device shown diagrammatically in FIG. 1 comprises an actuating member I of the elements of the device, an assembly II for the temporary storage of digital values, controlled by the actuating member, which supplies the digital values to be processed to a computing unit III.

After processing in this unit, the digital information is fed back to the temporary storing member. It may be subsequently converted to an analog information by means of a digital-analog converter 1 forming part of the device and directly controlled by the actuating member I. The analog signals issued from this converter are conveyed through an ombibus output cable BSA to a multiplexer 2 which dispatch them through a series of cables 21 to peripheral utilizing members. The different gates of this multiplexer are controlled by "address-signals" conveyed through an omnibus cable BAA issued from the storing assembly II. The inputs of this multiplexer are also connected, through a set of cables 22 to different peripheral sources of analog informations. In accordance with the address-signals issued from the omnibus cable BAA, these signals are selected and conveyed, through an omnibus input cable BEA, to an analog operator 4 included in the computing unit III. The temporary storing assembly II is also connected to a member 3 for the selection of digital data, through an omnibus cable BESN.

The member 3 is controlled by the address-signals issued from assembly II, through a cable BAN. The selecting member 3 is connected, through a set of cables 31, to peripheral receivers of informations and orders. It receives, through a set of cables 32, the digital informations supplied by sensors, data generators and the like.

The storing assembly II shown in FIG. 2, comprises a set of storing registers with eight bits, receiving, on actuation by the actuating member I, the analog and digital signals from an internal omnibus cable with eight conductors BDEST and delivering signals, on actuation by the same actuating member, to an internal omnibus cable with eight conductors BORG. Each of these registers comprises eight conventional electronic flip-flops having each an information input and an information output in the so-called "parallel" form.

On actuation of the actuating member I (address-signal), each of the eight flip-flops of a designated register takes the position corresponding to a logic binary level in response to a signal available in the omnibus cable BDEST. Similarly, upon actuation by the actuating member I, each flip-flop of a designated register may give its logic level to the internal omnibus cable BORG.

This set of eight registers comprises:

two analog output registers RSA 1 and RSA 2, connected, on actuation by the actuating member I, to a digital-analog converter 1, which may consist of a network of weighted resistances and which delivers an analog voltage representing the digital member contained in the registers RSA 1 and RSA 2;

a register RAA which contains the address of one of the gates of the multiplexer 2. On actuation, it transmits this address to the multiplexer through the omnibus cable BAA (see FIG. 1);

two registers RAN 1 and RAN 2 which contain the address of a digital gate of the member 3 for selecting the digital data (see FIG. 1), said gate, on actuation, establishing the connection of the omnibus cable BESN with a selected peripheral member.

This address may consist, for example, of a position in an external general core matrix memory, not shown;

a register RS, connected to the omnibus cable BESN and containing the digital information which has to be transmitted, when so ordered, to the digital peripheral unit indicated by the address-signal conveyed through the cable BAN and issued from the registers RAN 1 and RAN 2;

a register RE, receiving the digital information transmitted, through the omnibus cable BESN, from a digital peripheral unit indicated by an address-signal issued from registers RSA 1 and RSA 2;

a register of address RAP containing any one address of a location of a local memory MP of the pile type memory. This register, consisting of eight flip-flops wired to form a counter, is connected to the local memory MP through an address decoder DC. The actuating member I may then, at will, add or substract one binary unit to the register RAP. By this arrangement the utilization of memory MP may be speeded up.

This memory comprises a piling of four blocks of eight registers with 16 bits each. It comprises an ordinal counter, which contains, at any time, the numeral of the location of the general external memory from which the information has been picked up during the process, one or two accumulating registers for keeping a part of the information during the internal between consecutive instructions.

This part may consist, for example, of an information to be processed, or of the result of the processing of said information. This part further comprises one or two registers called "accumulator extension," one "base" register containing the indication of the storing location of the address in a memory zone, an index register containing the number which has to be added to a partial address number so as to find out the complete address number in a memory table, and an intermediate memory. Of course the number of blocks with eight registers of memory MP may be different from the selected number of 4 blocks, given by way of non limitative example.

The use of a pile memory offers the known advantages of giving the possibility, without complications, to stop the sequences of the program in progress, to process subprograms as justified by the interruption requirements, taking into account their priority order, if any, and to proceed again with the initial sequence.

The temporary storage member also comprises a set of gates $P_1$, $P_2$, $P_3$, $P_4$ for interconnecting the omnibus cable BDEST and the computing unit III, as further described hereinafter.

The computing unit, shown in FIG. 3, constitutes one of the characterizing parts of the invention. For the digital processing of the information, it comprises exclusively wired digital operators with 4 bits which, in view of their performances, have a better reliability and are less expensive than operators with 8, 16 or 32 bits. This unit further comprises analog operators used simultaneously with the digital operators.

This unit comprises, by way of example, 14 registers with 4 bits having the references $r_1, r_2 \ldots r_{14}$, 4 computing operators, 3 of which ($f$,$m$,Cn) are digital and one (Ca) analog, 7 state-indicators or registers with 1 bit and 5 internal omnibus cables with 4 conductors (BA, BB, BC, BD and BT).

The analog operator 4 is, for example, an analog comparing unit connected to the multiplexer 2, fed with analog data through cable BEA (see FIG. 1). On actuation by the actuating member I, two analog signals Ug and Ud, issued from peripheral members, are selected by the multiplexer and conveyed, through the cable BEA, to the inputs of the two sampling-blocking units SHD and SHC referenced 6 and 7 (analog memories) connected to the inputs of the analog comparator Ca which may be built from conventional analog amplifiers.

By way of example, these analog signals may be issued from a so called "hit-or-miss" control loop and consist for example of a measured signal and an assigned value which has to be compared thereto.

The operator Ca is connected to a state indicator IA, itself connected to the so-called "test" omnibus cable BT. When the algebraic difference between the voltages Ug and Ud is greater than a predetermined fixed threshold value, the operator issues, at its output, a "logic level" which puts in position the indicator I A.

In the opposite case, the indicator I A keeps its initial state. The operator Ca may also be used as analog digital converter. In this case the sampling-blocking unit 6 will be fed with an analog signal issued, for example, from an analog peripheral unit and the sampler 7 with a reference direct voltage proposed by the actuating member I. This analog voltage is supplied from one of the registers RSA 1 and RSA 2 (FIG. 2), which is connected, through the digital-analog converter 1, the cable BSA (FIG. 1), a "switch" K controlled by the actuating member and the omnibus cable BEA, to the sampling-blocking unit 7. On actuation, the analog comparator Ca detects the equality, if any, of the analog signal with the reference voltage. In the case of inequality of said signals, the actuating member proposes successively other reference voltages until an equality is detected.

In addition to this analog operator, the computing unit comprises several digital operators. By this term it is meant a circuit which performs instantaneously a logic or arithmetic operation on one or two digital operands present on its input terminals and which instantaneously issues a result or takes a decision, available on one of its output terminals. The informations are intermediately conveyed through omnibus cables BA and BB between said operators. This unit includes, by way of example, an adding operator with 4 bits $f$, connected to two cables BA and BB, whose output is connected, through an internal omnibus cable BC, to four registers $r_9$, $r_{10}$, $r_{11}$ and $r_{12}$ where are temporarily stored the results of the adding operations. On actuation by the actuating member I these registers deliver their informations to the cables BA and BB. The output of said adding operator with 4 bits is connected to the cable BT through two indicators ID and IR, respectively used as overflow and carry indicators.

The computing unit includes a second operator with 4 bits m which will consist, for example, of a multiplying operator. It is connected to cables BA and BB and transmits the result of the operations to two registers $r_{13}$ and $r_{14}$ through an omnibus cable BD. On actuation by the actuating member, the registers also release the information contained therein through two cables BA and BB.

The type of digital operators $f$ and $m$ is, of course, not limitative.

One of them may be, for example, a dividing operator or still a comparating operator of the AND, OR, OR exclusive . . . type.

The operator Cn is for example a digital comparing operator having its inputs respectively connected to cables BA and BB. On actuation by the actuating member, it compares the digital signals available on the two cables. Its output is connected to the omnibus cable BT through three state-indicators IPG, IEG and IPP (e.g., flip-flops).

These three state-indicating flip-flops assign their "logic level" to the test cable BT, depending on the fact that one of their signals is respectively greater, equal or lower than the other.

The multiplication of words of 8, 12 or 16 bits is performed according to a cycle of partial operations caried out simultaneously by operators $f$ and $m$ with 4 bits. The result of the operations, carried out by these operators is obtained, when ordered, from the storage member II. For this purpose of the outputs of the registers $r_9$ and $r_{10}$ on the one hand, and those of the registers $r_{11}$ and $r_{12}$ on the other hand, are connected to the omnibus cable BORG of the storage member (see FIG. 2). The conveyance of the information from the storage member II to the computing unit is performed by connecting the omnibus cable BDEST, through the gates $P_1 \ldots P_4$ (see FIG. 2), to eight registers $r_1$, $r_2 \ldots r_8$. These registers deliver the informations issued from the storage member to the internal omnibus cables BA and BB, on actuation by the actuating member I.

The omnibus cable BT is also connected to a state-indicator iT, receiving, from cable 5, the signals corresponding to the request of interruption of the operations being processed, issuing from external peripheral units.

The number of operators is, of course, not limited to those described in this embodiment.

Finally, the test omnibus cable BT is connected to the actuating member I as hereinafter described.

One of the characterizing features of the invention is also in the principle and the performance of the decoding of the instruction contained in the program of the actuating member shown in FIG. 4, making use of the so-called "micro-programmation" system. It comprises a read-only memory ROM, hereinafter called "dead" memory consisting for example of a diode matrix and an instruction dispatching unit which decodes and achieves the successive orders contained in the memory in the form of micro-instructions.

The operating cycles are timely scheduled by a member (not shown) supplying signals $H_1$ and $H_2$ of the same period T but shifted by half a period with respect to each other (see FIG. 4 A).

The program contained in the dead memory ROM is in the form of micro-instructions. During a first half-cycle defined by $H_1$, each micro-instruction is read in the memory. During the second half-cycle defined by $H_2$, the micro-instruction is prepared and achieved. Each micro-instruction read in the memory and which has, for example, a length of 16 bits, is transferred to a micro-instruction register system RMIC comprising 4 registers of 4 bits each.

Each micro-instruction always comprises a portion corresponding to an operating or working code, and groups of binary elements or "fields" each having a series of different functions or meanings.

The selection between the meanings assigned to each "field" is performed with consideration of the nature of the operation code.

The characteristic of the decoding system according to the invention is such that, depending on the nature of the code, each "field" is transferred to a register to which is assigned a well defined and unique function. For example, if the micro-instruction comprises 16 bits, the code operation is transferred to register CO and the three "fields" of 4 bits are respectively transferred to registers $CH_1$, $CH_2$ and $CH_3$ of the micro-instruction register system RMIC. The dispatching unit comprises, for example, 6 registers assigned to well defined and unique functions. Two of them, referenced RFA, are, for example, assigned to a function A, the four remaining registers RFB, RFE, RFC and RFF being respectively assigned to different functions B, E, C and F. The register $CH_3$ is connected to the registers RFA, the register $CH_2$ is connected to the registers RFB and RFE and the register $CH_1$ is connected to the registers RFC and RFF. The group of 4 bits forming the operation code may take 16 different values. Among these 16 values, 6 different values are selected and each of them is assigned to the control of one of the registers RF. According to the nature of the operation code and for each given micro-instruction, a decoder DC controls the transfer of the "fields" CH, $CH_2$ and $CH_3$, respectively to the registers RFA, RFE and RFF. This operation is performed during the half-cycle $H_2$.

Simultaneously the registers RFB and RFC, filled up, for example, by two fields of a preceding micro-instruction, are reset to zero.

Each register RF being assigned to a definite function, the instructions contained therein can be used directly for controlling any of the elements or any of the functions assigned to the device. This results in a considerable saving of time and material.

For sake of simplicity the number of the functional registers RF shown in the drawing is 6. However, in practical cases, there will be used a number of registers equal to the number of separate functions to be controlled. These functions are of a varied kind and correspond, for example, to register addresses, to orders for the operations and for the openings of certain sets of gates, to information or address transfers and the like.

The actuating member also comprises a register of micro-instruction addresses RAMC. The register RMIC is connected to the register RAMC itself connected to the dead memory ROM through an address decoder DAM. In view of avoiding the loss of a half-cycle period for performing the dispatching to the registers RF, the connection code is directly decoded in the register RMIC and introduced into the register RAMC during the half-cycle $H_2$. The register RAMC is also connected to the omnibus cable BT (see FIG. 3) collecting the signals produced by the state-indicators associated to the comparators Ca and Cn and by the indicator iT indicating the requirements of processing interruption.

From the foregoing description one skilled in the art can easily ascertain the essential characteristics of the invention and, without departing from the spirit and scope thereof, can make various changes and modifications of the invention to adapt it to various usages and conditions. Consequently, such changes and modifications are properly, equitably and intended to be within the full range of equivalence of the following claims.

What we claim is:

1. An automatic electronic device for conducting industrial processes comprising:

computing means, memory means for a program of microinstructions, an actuating member including dispatching means for microinstructions each formed of a coding binary digit group of binary digit groups assigned to elementary orders and whose meaning depends on the value of the coding binary digit group, said dispatching means including means for storing the coding binary digit group, means for separately storing each one of the binary digit groups assigned to elementary orders and each connected to at least one transfer register assigned to a unique and specific function, means for decoding the coding binary digit group including means for controlling the transfer of each one of the binary digit groups, assigned to elementary orders, to at least one register in accordance with the decoded value of the coding binary digit group, said registers producing control signals, and means for temporarily storing data including means for exchanging data with the computing means, means including an analog exchange unit for exchanging data with peripheral units producing analog signals, and means for exchanging data with peripheral units producing digital signals.

2. Device according to claim 1, wherein said actuating member comprises means for generating signals defining an operating cycle formed of two complementary cycle functions, one of which is delayed with respect to the other, means for transferring each microinstruction picked up from the memorizing means during the first cycle fraction to said storing means for the coding binary digit group and the binary digit groups assigned to elementary orders, means for transferring the binary digit groups assigned to elementary orders to the selected transfer registers, means for transferring to the memory means the binary digit coding group, and means for resetting to zero the other registers during the second cycle fraction.

3. Device according to claim 1, wherein the computing means comprises four binary digit registers.

4. Device according to claim 1, wherein the computing means comprises means for comparing analog signals having inputs connected to the peripheral units producing analog signals through the analog exchange unit and including means for establishing communication between one of the inputs of the comparing means and means for producing calibrated signals included in the actuating member.

5. Device according to claim 4, wherein said communication means comprises at least one register included in the temporary storage unit and having an input connected with the means for producing calibrated signals and an output connected with the analog exchange unit.

6. Device according to claim 1, wherein said computing means comprises at least a four binary digit operator.

* * * * *